(12) United States Patent
Miyashita et al.

(10) Patent No.: US 7,936,653 B2
(45) Date of Patent: May 3, 2011

(54) INFORMATION PROCESSING DEVICE, ACCESS DEVICE, RECORDING MEDIUM, INFORMATION PROCESSING METHOD, AND INFORMATION PROCESSING PROGRAM

(75) Inventors: Harumitsu Miyashita, Nara (JP); Junichi Minamino, Nara (JP); Takeshi Nakajima, Nara (JP)

(73) Assignee: Panasonic Corporation, Osaka (JP)

( * ) Notice: Subject to any disclaimer, the term of this patent is extended or adjusted under 35 U.S.C. 154(b) by 126 days.

(21) Appl. No.: 12/163,583

(22) Filed: Jun. 27, 2008

(65) Prior Publication Data
US 2008/0259783 A1 Oct. 23, 2008

Related U.S. Application Data

(63) Continuation of application No. 11/666,884, filed as application No. PCT/JP2005/018967 on Oct. 14, 2005.

(30) Foreign Application Priority Data

Nov. 2, 2004  (JP) ................................. 2004-319951

(51) Int. Cl.
G11B 7/00 (2006.01)

(52) U.S. Cl. .................................. 369/53.22; 369/47.27

(58) Field of Classification Search ............... 369/53.22, 369/44.27, 94, 47.27, 44.26, 257.3, 47.1, 369/53.21, 53.24, 275.3
See application file for complete search history.

(56) References Cited

U.S. PATENT DOCUMENTS

| | | | |
|---|---|---|---|
| 5,058,092 A * | 10/1991 | Miyasaka | 369/44.27 |
| 5,566,153 A | 10/1996 | Hosaka | |
| 6,061,318 A | 5/2000 | Hwang | |
| 6,249,499 B1 * | 6/2001 | Andoh | 369/53.22 |
| 6,298,024 B1 | 10/2001 | Nomura | |
| 6,345,022 B1 | 2/2002 | Ono et al. | |
| 6,842,419 B2 * | 1/2005 | Nakamura et al. | 369/100 |
| 7,302,588 B2 | 11/2007 | Sako et al. | |
| 7,477,586 B2 * | 1/2009 | Yamamoto et al. | 369/53.37 |
| 7,512,046 B2 * | 3/2009 | Yamamoto et al. | 369/53.22 |
| 2003/0161257 A1 | 8/2003 | Yusu et al. | |

(Continued)

FOREIGN PATENT DOCUMENTS
EP 0 910 079 4/1999

(Continued)

OTHER PUBLICATIONS
Chinese Office Action mailed Mar. 1, 2010 in Chinese Application No. 200910001330.1 (with English translation).

(Continued)

*Primary Examiner* — Nabil Z Hindi
(74) *Attorney, Agent, or Firm* — Wenderoth, Lind & Ponack, L.L.P.

(57) ABSTRACT

An information processing device is a device for processing specific information recorded to a recording medium, and has a characteristic identification unit and a processing unit. The characteristic identification unit identifies the reflection characteristic of the recording medium. The processing unit processes the specific information recorded to the recording medium according to the identified reflection characteristic. The reflection characteristic is either a first characteristic such that the reflectance of light reflected by a recorded region of the recording medium (referred to as first reflectance) is greater than the reflectance of light reflected by an unrecorded region of the recording medium (referred to as second reflectance), or a second characteristic such that the first reflectance is less than the second reflectance.

2 Claims, 7 Drawing Sheets

U.S. PATENT DOCUMENTS

2004/0130986 A1 7/2004 Minase et al.
2006/0023615 A1* 2/2006 Ootera ..................... 369/272.1

FOREIGN PATENT DOCUMENTS

| | | |
|---|---|---|
| JP | 04-259918 | 9/1992 |
| JP | 6-325482 | 11/1994 |
| JP | 11-25579 | 1/1999 |
| JP | 2000-260061 | 9/2000 |
| JP | 2000-311427 | 11/2000 |
| JP | 2000-343826 | 12/2000 |
| JP | 2001-43565 | 2/2001 |
| JP | 2001-312860 | 11/2001 |
| JP | 2003-323744 | 11/2003 |
| JP | 2004-171614 | 6/2004 |
| JP | 2004-206765 | 7/2004 |

OTHER PUBLICATIONS

European Search Report issued Apr. 21, 2010, in the corresponding European application No. 10 15 2042.
International Search Report issued Jan. 17, 2006 in the International (PCT) Application No. PCT/JP2005/018967.
Office Action issued Sep. 1, 2010 in connection with corresponding U.S. Appl. No. 12/163,563.
Supplemental European Search Report issued Nov. 28, 2008 in European Application No. 05793109.9.
U.S. Office Action mailed Feb. 24, 2010 in U.S. Appl. No. 11/666,884.

* cited by examiner

INFORMATION PROCESSING DEVICE, ACCESS DEVICE, RECORDING MEDIUM, INFORMATION PROCESSING METHOD, AND INFORMATION PROCESSING PROGRAM

This application is a continuation application of Ser. No. 11/666,884, filed May 2, 2007. which is the National Stage of International Application No. PCT/JP2005/018967, filed Oct. 14, 2005.

BACKGROUND OF THE INVENTION

1. Technical Field

The present invention relates to an information processing device for identifying and processing characteristic information of a recording medium, to an access device equipped with this information processing device, to a recording medium accessed by this access device, and to an information processing method and information processing program thereof.

2. Background Art

Vast amounts of information are used in communications today. This has prompted the development of large-capacity optical disks. Optical disks include compact disks (CD), laser discs (LD), and digital versatile discs (DVD).

The reproduction of information with an optical disk is performed by forming a reflective film composed of a metal thin film (such as aluminum) on a transparent substrate in which a textured pattern (such as pits or grooves) that convey information has been formed, and detecting the level of reflection of light from this pattern.

Recordable optical disks are formed with a characteristic pattern whose reflectance changes with the phase change of the recording film. Because an optical disk device need only read the change in reflectance between amorphous and crystalline phases, the optical system of an optical disk device can have a simple structure.

An optical disk device reproduces information recorded on the basis of phase change by detecting the reflection levels of a plurality of recorded portions and a plurality of unrecorded portions. Therefore, an optical disk can either be one having a characteristic such that the reflectance of light reflected by the plurality of recorded portions is greater than the reflectance of light reflected by the plurality of unrecorded portions (L-to-H characteristic), or one having a characteristic such that the reflectance of light reflected by the plurality of recorded portions is less than the reflectance of light reflected by the plurality of unrecorded portions (H-to-L characteristic).

FIG. 7 shows the relation between the reflection level of light reflected by an optical disk and a plurality of recording marks formed on the optical disk. FIG. 7A shows the relation between the reflection level of light reflected by an optical disk having an H-to-L characteristic and a plurality of recording marks formed on an optical disk having an H-to-L characteristic. FIG. 7B shows the relation between the reflection level of light reflected by an optical disk having an L-to-H characteristic and a plurality of recording marks formed on an optical disk having an L-to-H characteristic.

Amorphous portions (recorded portions, such as recording marks) in which the reflectance of light is about 1% are formed on an optical disk having an H-to-L characteristic (H-to-L type optical disk). The reflectance of light is 15 to 25% in the crystalline portions (unrecorded portions, such as spaces) of an H-to-L type optical disk (see FIG. 7A). Amorphous portions (recorded portions, such as recording marks) in which the reflectance of light is 20 to 30% are formed on an optical disk having an L-to-H characteristic (L-to-H type optical disk). The reflectance of light is 3 to 10% in the crystalline portions (unrecorded portions, such as spaces) of an L-to-H type optical disk (see FIG. 7B).

With an H-to-L type optical disk, focusing and tracking are easier because of the high reflectance of the unrecorded portions, but because the average reflectance of light is higher, there is more noise than with an L-to-H type optical disk.

With an L-to-H type optical disk, the average reflectance of light is lower, so there is less noise than with an H-to-L type optical disk, but because the reflectance is lower in the unrecorded portions, focusing and tracking are more difficult.

Patent Document 1 discusses both an H-to-L type optical disk and an L-to-H type optical disk.

Patent Document 1: Japanese Laid-Open Patent Application 2003-323744

However, because an optical disk device is unable to identify whether an optical disk that is inserted into the optical disk device is an H-to-L type optical disk or an L-to-H type optical disk, the following problems (1) to (4) occur when an L-to-H type optical disk is inserted into an optical disk device corresponding to an H-to-L type optical disk, or when an H-to-L type optical disk is inserted into an optical disk device corresponding to an L-to-H type optical disk.

(1) An H-to-L type optical disk and an L-to-H type optical disk have opposite polarity of the light reflected by spaces and the light reflected by recording marks, so the polarity (positive or negative) of the detection value in edge detection, asymmetry detection, or β value detection is opposite between an H-to-L type optical disk and an L-to-H type optical disk.

(2) Defective portions of the optical disk (such as portions that reflect almost no light because of debris, dirt, or the like adhering to the optical disk) cannot be properly detected.

(3) With a modulation measurement method corresponding to an H-to-L type optical disk, the modulation of an L-to-H type optical disk cannot be properly measured.

(4) When an L-to-H type optical disk is inserted into a device corresponding to an H-to-L type optical disk, the dynamic range of the integrated circuit of the device may be exceeded. This is because the light reflection level of with an L-to-H type optical disk is greater than the light reflection level of an H-to-L type optical disk.

Summary of the Invention

The present invention was conceived in light of the above problems, and it is an object thereof to provide an information processing device with which information recorded to a recording medium can be properly processed regardless of the reflection characteristic of the recording medium (the characteristic specifying whether the medium is an H-to-L type or an L-to-H type), as well as an access device equipped with this information processing device, a recording medium that is accessed by this access device, and an information processing method and information processing program thereof.

The information processing device of the present invention is an information processing device for processing specific information recorded to a recording medium, comprising a characteristic identification unit and a processing unit. The characteristic identification unit identifies a reflection characteristic of a recording medium. The processing unit processes specific information according to the identified reflection characteristic. The term "reflection characteristic" as used here refers to either a first characteristic such that the reflectance of light reflected by a recorded region of the recording medium (hereinafter referred to as first reflectance) is greater than the reflectance of light reflected by an unrecorded region of the recording medium (hereinafter referred to as second reflectance), or a second characteristic such that the first reflectance is less than the second reflectance.

This information processing device identifies the reflection characteristic of a recording medium and processes specific information recorded on the recording medium, according to the reflection characteristic. Accordingly, information recorded on the recording medium can be properly processed regardless of the reflection characteristic of the recording medium.

The "specific information" referred to above and below includes, for example, user information such as audio, video, and other data, and test-write information used to perform recording learning in which specific information is temporarily recorded.

The characteristic identification unit may identify the reflection characteristic on the basis of characteristic information recorded to the recording medium, which is information indicating at least either one of the first characteristic and the second characteristic.

The recording medium may have a plurality of recording layers, and characteristic information corresponding to the reflection characteristic of each of the plurality of recording layers may be recorded.

Alternatively, the characteristic identification unit may identify the reflection characteristic on the basis of a reflection level of light reflected by the recording medium.

The processing unit may include a polarity inversion unit for inverting a polarity of the specific information according to the identified reflection characteristic.

The processing unit may include a modulation computation unit for computing the modulation of the specific information according to the identified reflection characteristic.

The processing unit may include a threshold changing unit for changing a threshold for detecting a defective portion of the recording medium, which is a threshold with respect to a reflection level of light reflected by the recording medium, on the basis of the reflection level and the identified reflection characteristic.

The information processing device may further comprise a reflection level detection unit and a defective portion detection unit. The reflection level detection unit detects the reflection level. The defective portion detection unit detects a defective portion of the recording medium on the basis of the threshold changed by the threshold changing unit and the reflection level detected by the reflection level detection unit.

The processing unit may include a reflection level adjustment unit for adjusting a reflection level of the light irradiated, according to the identified reflection characteristic.

The access device of the present invention comprises a reading unit for reading specific information recorded to a recording medium, and the above-mentioned information processing device for processing the specific information that has been read. The stated object is thereby achieved.

The recording medium of the present invention has a recording region, and the recording region is a region for recording characteristic information indicating a characteristic of the recording medium. The characteristic information is information indicating at least either one of a first characteristic such that the reflectance of light reflected by a recorded region of the recording medium (referred to as first reflectance) is greater than the reflectance of light reflected by an unrecorded region of the recording medium (referred to as second reflectance), and a second characteristic such that the first reflectance is less than the second reflectance.

The recording medium has a region for recording characteristic information. Therefore, it is possible, for example, to provide characteristic information to a device for processing information recorded to a recording medium and to cause the device to perform processing according to that characteristic information. Specifically, information recorded to the recording medium can be properly processed regardless of the reflection characteristic indicated by the characteristic information of the recording medium.

The recording medium may comprise a plurality of recording layers, and characteristic information corresponding to each of the plurality of recording layers may be recorded in the recording region.

The information processing method of the present invention is an information processing method for processing specific information recorded to a recording medium, comprising a characteristic identification step and a processing step. In the characteristic identification step, the reflection characteristic of the recording medium is identified. In the processing step, specific information is processed according to the identified reflection characteristic. The term "reflection characteristic" as used here refers to either a first characteristic such that the reflectance of light reflected by a recorded region of the recording medium (first reflectance) is greater than the reflectance of light reflected by an unrecorded region of the recording medium (second reflectance), or a second characteristic such that the first reflectance is less than the second reflectance. The stated object is thereby achieved.

The information processing program of the present invention is an information processing program for executing information processing in an information processing device for processing specific information recorded to a recording medium, comprising a characteristic identification step and a processing step. In the characteristic identification step, the reflection characteristic of the recording medium is identified. In the processing step, specific information is processed according to the identified reflection characteristic. The term "reflection characteristic" as used here refers to either a first characteristic such that the reflectance of light reflected by a recorded region of the recording medium (first reflectance) is greater than the reflectance of light reflected by an unrecorded region of the recording medium (second reflectance), or a second characteristic such that the first reflectance is less than the second reflectance. The stated object is thereby achieved.

The information processing device of the present invention comprises a characteristic identification unit for identifying a reflection characteristic of a recording medium, and a processing unit for processing specific information recorded to the recording medium, according to the identified reflection characteristic. As a result, specific information recorded to a recording medium can be properly processed regardless of the reflection characteristic of the recording medium.

Similarly, with the access device, information processing method, and information processing program of the present invention, the reflection characteristic of the recording medium of the present invention can be identified and specific information processed according to that reflection characteristic, so the information recorded to the recording medium can be properly processed.

Also, with the recording medium of the present invention, characteristic information indicating a first characteristic and/or a second characteristic is recorded, the first characteristic is a characteristic such that the reflectance of light reflected by a recorded region of the recording medium (first reflectance) is greater than the reflectance of light reflected by an unrecorded region of the recording medium (second reflectance), and the second characteristic is a characteristic such that the first reflectance is less than the second reflectance. Therefore, whether the characteristic of the recording medium is the first characteristic or the second characteristic can be determined from the characteristic information recorded to the recording medium. As a result, the information recorded to the recording medium can be processed according to the characteristic of the recording medium.

Figure 1:
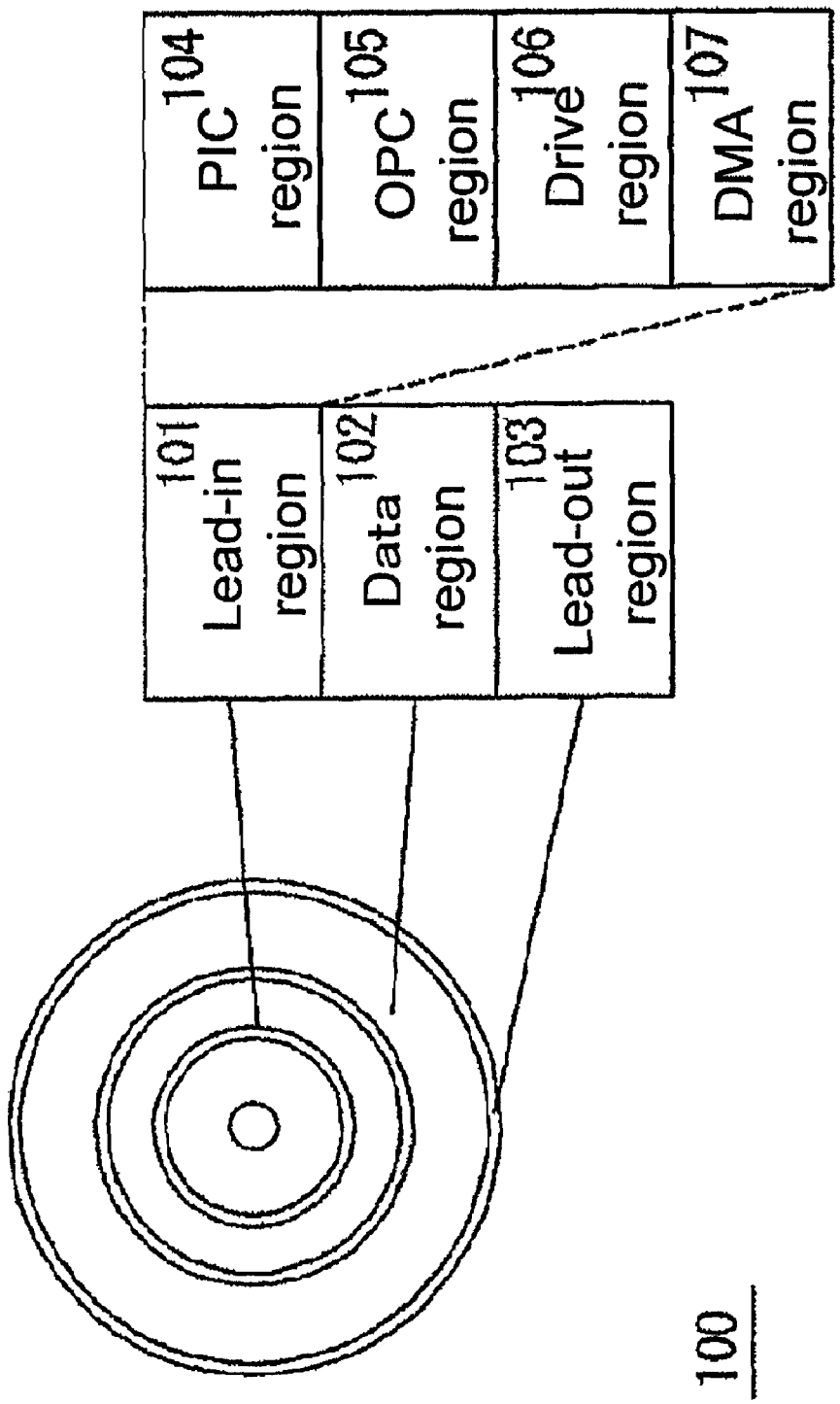
FIG. 1 shows the structure of a recording medium 100 in an embodiment of the present invention.

REFERENCE NUMERALS 100 recording medium
101 lead-in region
102 data region
103 lead-out region
104 PIC region
105 OPC region
106 drive region
107 DMA region
200 access device
202 optical head
204 characteristic identification unit
206 signal polarity inversion unit
208 signal processing unit
210 edge shift detection unit
212 asymmetry detection unit
214 β value detection unit
216 modulation computation unit
217 threshold changing unit
218 defective portion detection unit
219 optical disk controller
220 reflection level adjustment unit

DETAIL DESCRIPTION OF THE INVENTION

Embodiments of the present invention will now be described through reference to the drawings.

First, the recording medium of the present invention will be described (see "1. Recording Medium"), and then the access device that accesses this recording medium will be described (see "2. Access Device"). Finally, the access processing procedure executed by the access device will be described (see "3. Access Method").

1. Recording Medium

FIG. 1 shows the structure of a recording medium 100 in an embodiment of the present invention. The recording medium 100 includes a recording layer. Information is recorded to the recording medium 100 by forming recording marks in the recording layer.

The recording medium 100 includes a lead-in region 101, a data region 102, and a lead-out region 103.

User information is recorded in the data region 102. Examples of user information include audio information, video information, and other such data.

Data for defect control, and control information for the recording medium 100 are recorded in the lead-in region 101 and the lead-out region 103.

The lead-in region 101 includes a PIC (Permanent Information and Control data) region 104, an OPC (Optimum Power Calibration) region 105, a drive region 106, and a DMA region 107.

The recording pulse control parameters and largest address of the data region 102, for example, are recorded in the PIC region 104. Examples of recording pulse control parameters include parameters related to the laser power for forming or erasing a plurality of recording marks on the recording medium 100, and parameters related to the recording pulse width for recording a plurality of recording marks.

Characteristic information is also recorded in the PIC region 104. This characteristic information indicates whether the reflection characteristic of the recording medium 100 is an L-to-H characteristic or an H-to-L characteristic.

The H-to-L characteristic is a reflection characteristic such that the reflectance of light reflected by a plurality of recorded regions (such as a plurality of recording marks) is less than the reflectance of light reflected by a plurality of unrecorded regions (such as a plurality of spaces). The L-to-H characteristic is a reflection characteristic such that the reflectance of light reflected by a plurality of recorded regions (such as a plurality of recording marks) is greater than the reflectance of light reflected by a plurality of unrecorded regions (such as a plurality of spaces). If the recording medium 100 has an H-to-L characteristic, a value of "0" is recorded as the characteristic information. If the recording medium 100 has an L-to-H characteristic, a value of "1" is recorded as the characteristic information to the recording medium 100.

Information indicating that the recording medium 100 has an L-to-H characteristic is not necessarily indicated by a value of "1," just as information indicating that the recording medium 100 has an H-to-L characteristic is not necessarily indicated by a value of "0." Any value can be indicated, so long as the device in question is able to identify the reflection characteristic of the recording medium 100 (whether it has an L-to-H characteristic or an H-to-L characteristic).

For instance, as long as the device in question is able to identify the reflection characteristic of the recording medium 100 (whether it has an L-to-H characteristic or an H-to-L characteristic), the characteristic can be indicated by one or more recording marks and/or one or more spaces.

The characteristic information is not limited to a configuration of being indicated by one or more recording marks and/or one or more spaces. As long as the device in question is able to identify the reflection characteristic of the recording medium 100 (whether it has an L-to-H characteristic or an H-to-L characteristic) on the basis of the characteristic information, the characteristic information may be recorded by the wobble of a track.

Furthermore, tracks are formed as concentric circles in the recording medium 100, but as long as characteristic information can be recorded in the recording medium 100, the shape in which the tracks are formed may be spiral.

Further, the recording medium 100 is not limited to a rewritable type or a write-once type. As long as the characteristic information can be recorded, a read-only type of recording medium may also be used. Examples of the recording medium 100 include a CD, BD-RE (Blu-ray Disc Rewritable Format), DVD-RAM (Digital Versatile Disc Random Access Memory), and DVD-RW (Digital Versatile Disc Rewritable).

Furthermore, the recording medium 100 is not limited to having just one recording layer. The recording medium 100 can instead have a plurality of recording layers. For instance, when the recording medium 100 includes a first recording layer and a second recording layer, the characteristic information may be recorded to either the first recording layer or the second recording layer. In this case, the characteristic information can indicate that the first recording layer and the second recording layer have an H-to-L characteristic (or an L-to-H characteristic). Further, when the recording medium 100 includes a first recording layer and a second recording layer, the first characteristic information may be recorded to the first recording layer, and the second characteristic information to the second recording layer. In this case, the first characteristic information can indicate that the first recording layer has an H-to-L characteristic (or an L-to-H characteristic), and the second characteristic information can indicate that the second recording layer has an H-to-L characteristic (or an L-to-H characteristic). The first recording layer and second recording layer are not limited to having the same characteristic, and it is possible that first recording layer and second recording layer will have different characteristics. For instance, the first characteristic information recorded to the first recording layer may indicate that the first recording layer has an H-to-L characteristic (or an L-to-H characteristic), and the second characteristic information recorded to the second recording layer may indicate that the second recording layer has an L-to-H characteristic (or an H-to-L characteristic).

Also, the characteristic information for the plurality of layers may be recorded in any of the other layers. For instance, the first recording layer may contain first characteristic information indicating the reflection characteristic of the first recording layer, and second characteristic information indicating the reflection characteristic of the second recording layer. Also, the characteristic information for all of the plurality of layers may be recorded in each layer. For instance, the first recording layer and the second recording layer may both contain the first characteristic information and second characteristic information.

Specifically, with the recording medium 100 having a plurality of layers, information indicating the reflection characteristics corresponding to the plurality of layers may be recorded in any of the layers.

Furthermore, the region in which the characteristic information is recorded is not limited to the PIC region 104. As long as characteristic information can be recorded and the device in question is able to read the characteristic information, there are no restrictions on the recording location on the recording medium. For example, characteristic information can be recorded in the lead-out region 103. Alternatively, characteristic information may be recorded in the data region 102.

Characteristic information is recorded by the recording medium manufacturer when the recording medium 100 is manufactured. If the recording medium 100 is a read-only recording medium, it is shipped in a state in which data has already been recorded. The recording medium manufacturer ships the recording medium after recording characteristic information in the PIC region. If the recording medium 100 is a rewritable recording medium or a write-once recording medium (such as a DVD-RAM or a DVD-RW), the recording medium manufacturer records information related to the recording medium in a recording region (such as the PIC region) during the manufacture of the recording medium.

The recording of characteristic information to the recording medium 100 does not necessarily have to be performed during the manufacture of the recording medium 100. For instance, characteristic information may be recorded by the user during the recording of user information to the recording medium 100, or during the reproduction of user information. The device in question reads characteristic information during access to the recording medium 100 (such as when user information is being recorded to the recording medium 100, or when user information is being reproduced).

2. Access Device

Figure 2:
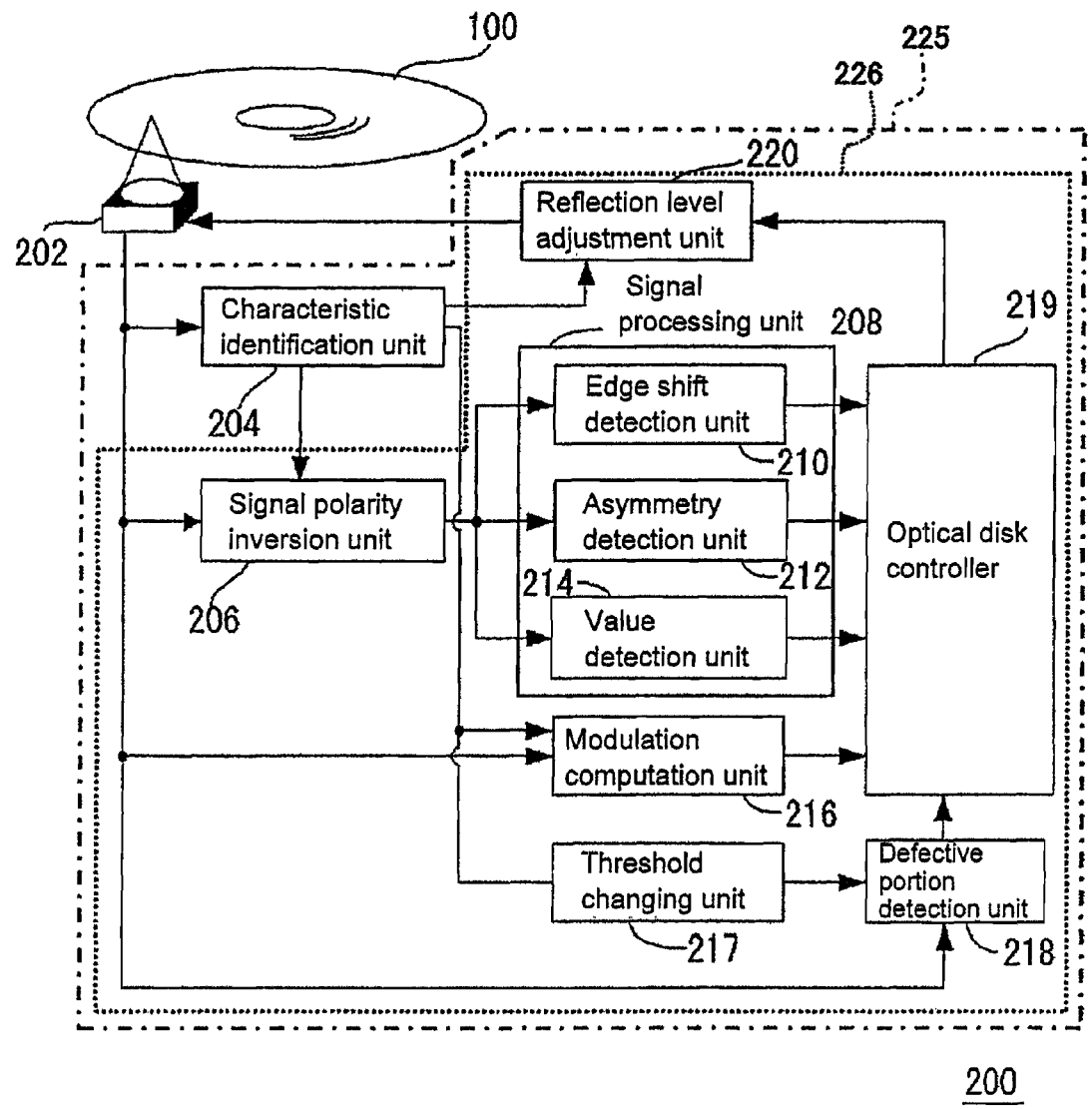
FIG. 2 shows the structure of an access device 200 in an embodiment of the present invention.

FIG. 2 shows the structure of an access device 200 in an embodiment of the present invention.

The access device 200 is configured so as to allow the insertion of the recording medium 100. The recording medium 100 includes a characteristic information region in which characteristic information is to be recorded, and characteristic information is recorded in this characteristic information region.

The access device 200 mainly consists of an optical head 202 that reads specific information recorded to the recording medium 100, and an information processing device 225 that processes the specific information that has been read. The information processing device 225 comprises a characteristic identification unit 204 for identifying the reflection characteristic of the recording medium 100, and a processing unit 226 for processing specific information according to the identified reflection characteristic. The processing unit 226 comprises a signal polarity inversion unit 206, a signal processing unit 208, a modulation computation unit 216, a threshold changing unit 217, a defective portion detection unit 218, an optical disk controller 219, and a reflection level adjustment unit 220.

The optical head 202 accesses the recording medium 100 and functions as a reading unit for reading a signal that indicates the recorded information from the recording region of the recording medium 100. Information includes characteristic information and user information. Examples of user information include audio information, video information, and other such data.

The characteristic identification unit 204 detects the characteristic information from the signal read by the optical head 202, and identifies the characteristic of the recording medium 100 (whether the recording medium 100 is an H-to-L type optical disk or an L-to-H type optical disk) on the basis of the detected characteristic information.

The signal polarity inversion unit 206 inverts the polarity of a signal indicating user information on the basis of the characteristic information read by the optical head 202.

For example, when the recording medium 100 is an H-to-L type, the polarity of a signal corresponding to a recording mark is inverted from negative to positive, and the polarity of a signal corresponding to a space is inverted from positive to negative. On the other hand, if the recording medium 100 is an L-to-H type, the polarity of a signal corresponding to a recording mark is kept positive, and the polarity of a signal corresponding to a space is kept negative.

The signal processing unit 208 includes an edge shift detection unit 210, an asymmetry detection unit 212, and a β value detection unit 214. The inputted signals are processed by these units included in the signal processing unit 208. For example, the edge shift detection unit 210 detects the amount of edge shift on the basis of the inputted signal. The asymmetry detection unit 212 detects the asymmetry of the signal on the basis of the inputted signal. The β value detection unit 214 detects the β value of the signal on the basis of the inputted signal.

The signal polarity inversion unit 206 controls the polarity of the signals so that, of the signals indicating user information, the polarity of a signal corresponding to a recording mark will be positive, and of the signals indicating user information, the polarity of signals corresponding to a space will be negative. After this control of their polarity, the signals are inputted to the signal processing unit 208. Therefore, the signal processing unit 208 is able to process the inputted signals on the premise that the polarity of signals corresponding to recording marks is positive and the polarity of signals corresponding to spaces is negative, regardless of whether the recording medium 100 loaded in the access device 200 is an H-to-L type optical disk or an L-to-H type optical disk. As a result, the system controller requires no further development, and debugging efficiency is improved.

The modulation computation unit 216 computes the modulation of a signal indicating user information, according to the characteristic information. The function of the modulation computation unit 216 will be described in detail below.

The defective portion detection unit 218 detects one or more defective portions on the basis of a predetermined threshold value and the reflection level of reflected light detected by the optical head 202. For example, foreign matter (dirt, fingerprints, etc.) may adhere to the recording region of the recording medium 100. If a region where foreign matter has adhered is irradiated with light, the foreign matter will scatter the reflected light. Therefore, it is almost impossible to detect the reflection level of reflected light from a region in which foreign matter has adhered. The defective portion detection unit 218 detects as a defective portion any region where almost no reflected light can be detected.

The threshold changing unit 217 changes a predetermined threshold value in order to adjust the difference between the predetermined threshold value and the detected reflection level, according to the characteristic information. For example, the threshold changing unit 217 changes the predetermined threshold value according to the characteristic information so that it will be possible to detect an abnormality in the detected reflection level by adjusting the difference between the predetermined threshold value and the detected reflection level.

The functions of the threshold changing unit 217 and the defective portion detection unit 218 will be described in detail below.

The optical disk controller 219 adjusts the level of irradiation with light used for recording information to the recording medium 100, on the basis of the signal outputted by at least one of the signal processing unit 208, the modulation computation unit 216, and the defective portion detection unit 218. For example, the adjusted light irradiation level indicates one or more of the write power, erase power, and bottom power.

The reflection level adjustment unit 220 adjusts the reflection level of light used for reproducing information from the recording medium 100, on the basis of the characteristic information and the signal produced by the optical disk controller 219. The reflection level adjustment unit 220 adjusts the light reflection level by adjusting the level at which the recording medium 100 is irradiated with light by the optical head 202. For instance, when the characteristic information indicates that the recording medium 100 is an L-to-H type, the reflection level adjustment unit 220 lowers the light reflection level by reducing the intensity of the light emitted by the optical head 202. Therefore, the intensity of light reflected by an L-to-H type optical disk can be reduced. As a result, the dynamic range of an integrated circuit can be used more efficiently.

The function of the modulation computation unit 216 will now be described in detail.

The modulation computation unit 216 computes the modulation of specific information on the basis of the characteristic information and the light reflection level detected by the optical head 202. More specifically, the modulation computation unit 216 detects the reflection level of light reflected by unrecorded regions (spaces) and the reflection level of light reflected by recorded portions (recording marks) from the light reflection level detected by the optical head 202, and computes the modulation of specific information on the basis of the two detected levels. The light reflection level detected by the optical head 202 here indicates specific information.

Figure 3A:
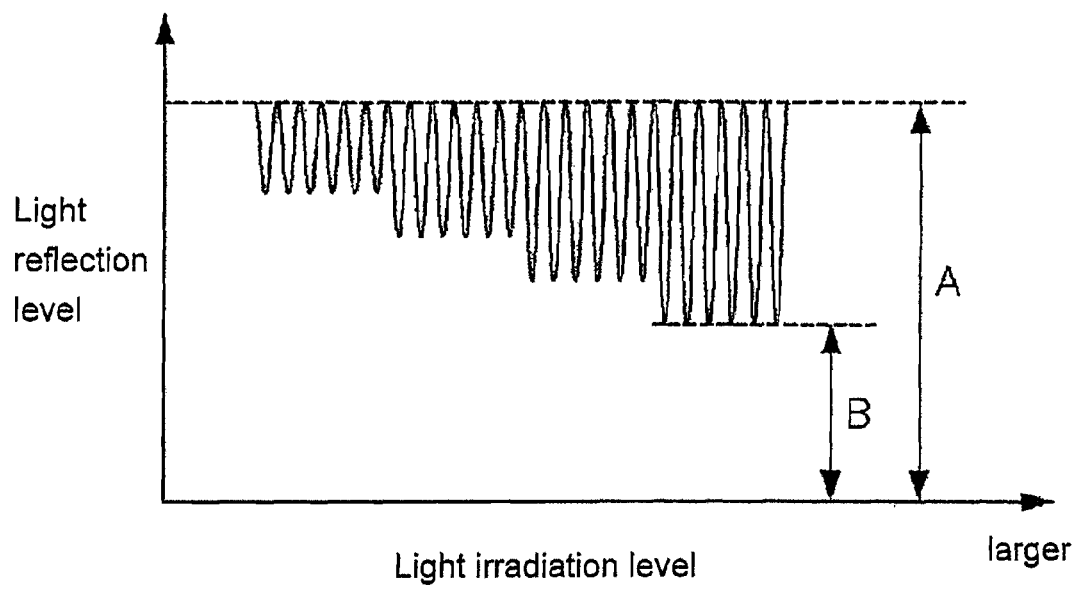
FIG. 3A shows the relation between the irradiation level of light irradiating an optical disk having a second characteristic (H-to-L characteristic) and the reflection level of light reflected by this optical disk.
Figure 3B:
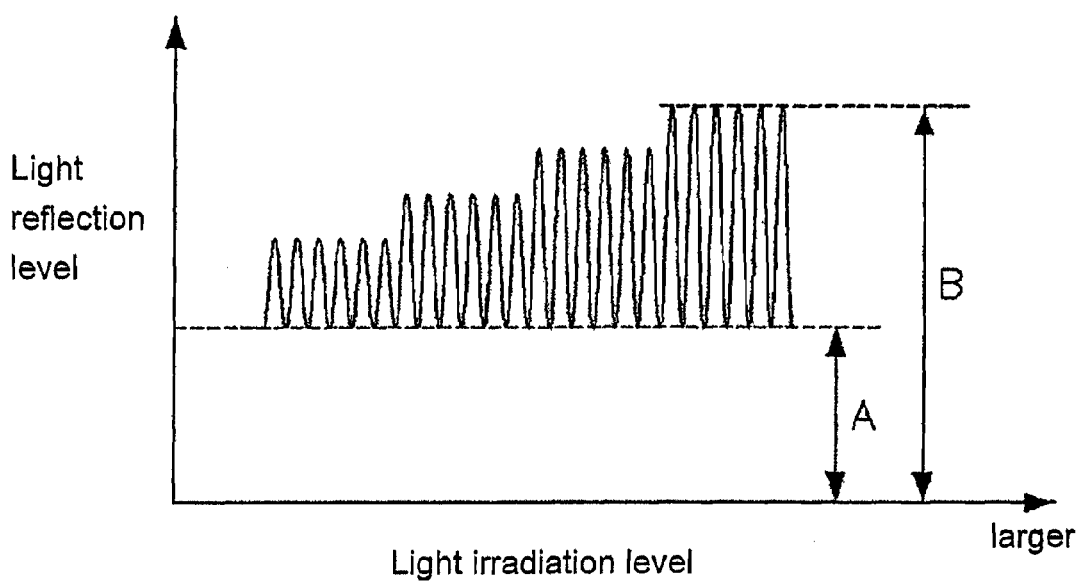
FIG. 3B shows the relation between the irradiation level of light irradiating an optical disk having a first characteristic (L-to-H characteristic) and the reflection level of light reflected by this optical disk.

FIGS. 3A and 3B show the relation between the irradiation level of light irradiating an optical disk and the reflection level of light reflected by this optical disk. FIG. 3A shows the relation between the irradiation level of light irradiating an H-to-L type optical disk and the reflection level of light reflected by an H-to-L type optical disk. The horizontal axis is the level at which the H-to-L type optical disk is irradiated with light, and the vertical axis is the level at which light is reflected by the H-to-L type optical disk.

When the characteristic indicated by the characteristic information is an H-to-L characteristic, the modulation Mod is defined by Formula 1.

$$\text{Mod}=(A-B)/A \qquad \text{Formula 1:}$$

Here, 'A' is the reflection level of light reflected by unrecorded regions (spaces), and 'B' is the reflection level of light reflected by recording regions (recording marks).

FIG. 3B shows the relation between the irradiation level of light irradiating an L-to-H type optical disk and the reflection level of light reflected by an L-to-H type optical disk. The horizontal axis is the level at which the L-to-H type optical disk is irradiated with light, and the vertical axis is the level at which light is reflected by the L-to-H type optical disk.

When the characteristic indicated by the characteristic information is an L-to-H characteristic, the modulation Mod is defined by Formula 2.

$$\text{Mod}=(B-A)/B \qquad \text{Formula 2:}$$

The modulation computation unit 216 includes a first computer for computing Formula 1, and a second computer for computing Formula 2. The modulation computation unit 216 is able to compute the modulation of specific information by switching between these two computers according to the characteristic information.

In the past, modulation was computed by the same formula even with optical disks having different reflection characteristics, so when the modulation of an L-to-H type optical disk was measured with the above-mentioned Formula 1, for instance, a problem was that the modulation sensitivity was poor. However, the modulation sensitivity can be equalized by finding the degree of modulation by switching between a first computer for computing Formula 1 and a second computer for computing Formula 2 according to the reflection characteristic of the optical disk, as in this embodiment.

The optimal recording power, for example, can be determined more accurately by increasing the precision of modulation measurement in this embodiment. The method for determining the optimal recording power will now be described through reference to FIGS. 4A and 4B.

Figure 4A:
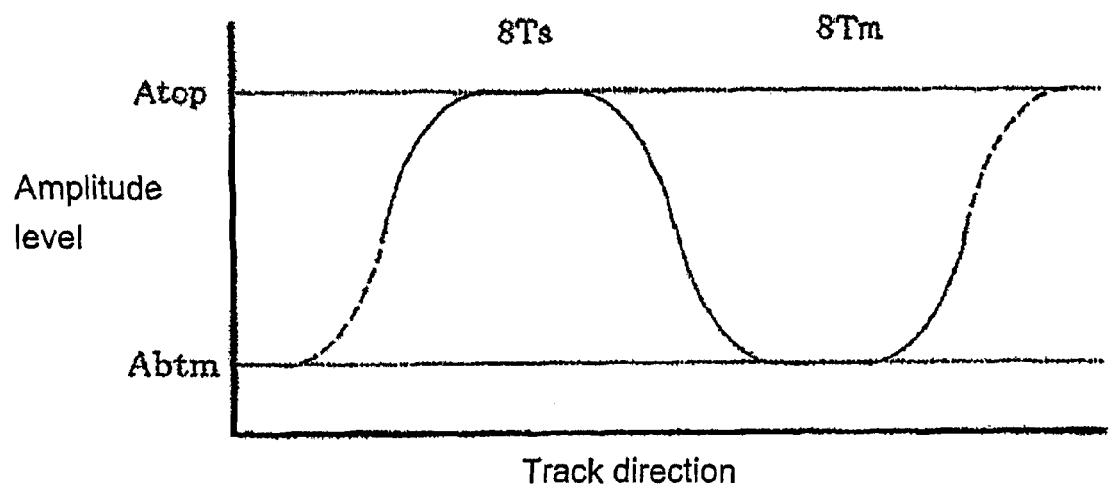
FIG. 4A shows the relation between tracking direction and reproduction amplitude when information was reproduced from recorded portions and unrecorded portions of an optical disk.

FIG. 4A is a graph of the reproduction of recorded portions and unrecorded portions in a single repeating pattern of 8 T space (8 Ts) and 8 T mark (8 Tm), using an H-to-L type disk with reduced reproduction amplitude in the recorded portions. The vertical axis is the reproduction amplitude level when the recorded portions and unrecorded portions were reproduced, while the horizontal axis is the track direction (time axis direction). As shown in FIG. 4A, Atop is the maximum value for the reflection level of the reproduction signal, while Abtm is the minimum value for the reflection level of the reproduction signal. Atop and Abtm are levels of amplitude from a certain reference level. The reference level here may, for example, be the level detected when laser power used for reproduction is shut off (that is, at laser extinction). The reference level may also be a predetermined level in a circuit for detecting reproduction amplitude. An 8 T repeating signal is used to find the modulation in this embodiment, but the present invention is not limited to this.

Figure 4B:
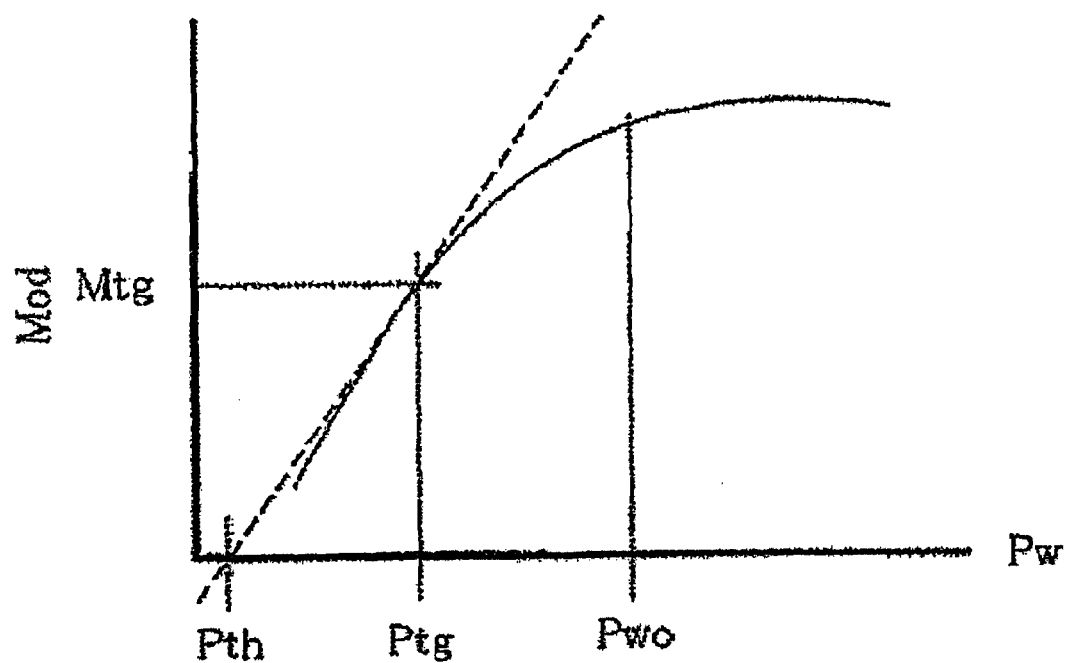
FIG. 4B shows the relation between modulation and recording power of an optical disk.

As shown in FIG. 4B, the modulation Mod is measured by varying the recording power Pw (from high power down to low power) in order to determine the optimal recording power Pwo. The vertical axis in FIG. 4B is the modulation Mod when a recorded track was reproduced by varying the recording power, and the horizontal axis is the change in the recording power Pw. When the recording power Pw is low, the amplitude of the reproduction signal is small, so the modulation Mod is smaller. As the recording power Pw rises, the amplitude of the reproduction signal also grows, so the modulation Mod is larger. Parameters are readied for determining the recording power of each disk. These parameters are placed ahead of time on the disk, or are stored by a recording and reproduction device for each disk. Examples of these are the modulation (Mtg) obtained at a certain recording power (Ptg), the recording power Pth when recording begins (when the amount of reflection begins to change as the disk is irradiated with a laser), a proportional relationship parameter kk of Pth and Ptg, and a proportional relationship parameter rr between Ptg and Pwo. These are in a relationship such that Ptg=Pth×kk and Pwo=Ptg×rr. Pth is obtained from a tangent to the modulation curve when recording at a recording power near Ptg. The procedure for determining the optimal recording power involves first measuring the modulation at a numerical power near Ptg to obtain a modulation curve as shown in FIG. 4B. The modulation near Mtg is used to find a tangent, and Pth is found as the point of intersection with the X axis. Pth is multiplied by kk and rr to compute the optimal recording power Pwo.

As discussed above, the degree of modulation is used in the computation of the optimal recording power Pwo. Accordingly, it is necessary to find a suitable modulation in order to compute the optimal recording power Pwo. In this embodiment, the modulation is found by switching between a first computer for computing Formula 1 and a second computer for computing Formula 2, according to the reflection characteristic of the optical disk. Accordingly, it is possible to compute a suitable modulation, which in turn makes it possible to compute the optimal recording power Pwo.

The function of the threshold changing unit 217 and the defective portion detection unit 218 will now be described in detail.

Figure 5:
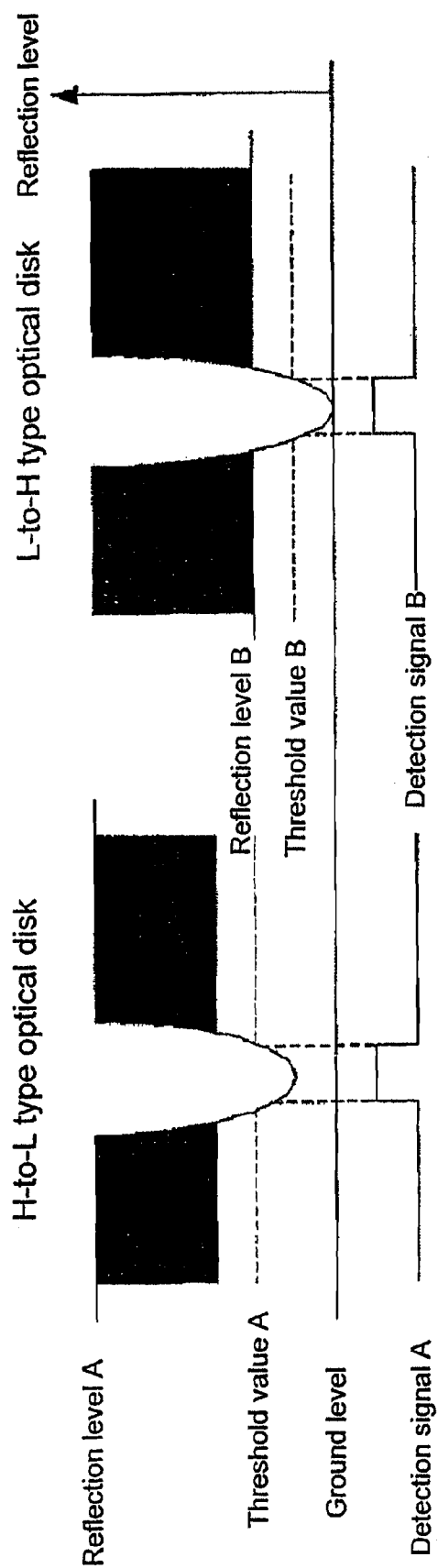
FIG. 5 shows the detection signal, ground level, threshold value, and reflection level of detected light.

FIG. 5 shows the detection signal, ground level, threshold value, and reflection level of detected light.

A defective portion is detected on the basis of the threshold value and reflection level of the light. The difference between the ground level and the reflection level B of light reflected by the spaces (unrecorded portions) of an L-to-H type optical disk is smaller than the difference between the ground level and the reflection level A of light reflected by spaces (unrecorded portions) of an H-to-L type optical disk. Therefore, with an L-to-H type optical disk, the threshold value B used for detecting defective portions must be set accurately between the ground level and the reflection level B. For example, if a threshold value A is set for an L-to-H type optical disk, because the level of the threshold value A is close to the reflection level B, unrecorded portions (spaces) may be falsely detected as defective portions.

When the characteristic identification unit 204 determines on the basis of the characteristic information that the characteristic of an optical disk is an L-to-H characteristic, the threshold changing unit 217 changes the threshold value so that an abnormality in the detected reflection level can be detected. For instance, the threshold value B is changed so as to be smaller in order to increase the difference between the ground level B and the light reflection level B. The threshold changing unit 217 outputs a signal indicating a reduced threshold value (threshold value B) to the defective portion detection unit 218.

The defective portion detection unit 218 compares the reflection level with the threshold value B indicated by the signal, and produces a detection signal B indicating a defective portion.

Thus, defective portions can be accurately detected on the basis of the threshold value B and the light reflection level B by changing the threshold value so that an abnormality in the detected reflection level can be detected. The access device 200 puts the control operation on hold while defective portion detection is in progress. The access device 200 can accurately recognize the period when the control operation has to be put on hold, by accurately detecting defective portions. In this case, the access device 200 may be designed such that the regions of detected defective portions are recorded ahead of time, and these recorded regions are not subjected to the control operation during control.

The access device 200 in an embodiment of the present invention was described above through reference to FIGS. 2 to 5.

For instance, in the example described through reference to FIG. 2, the optical head 202 functioned as the "reading unit for reading specific information recorded to a recording medium," and the characteristic identification unit 204, the signal polarity inversion unit 206, the signal processing unit 208, the modulation computation unit 216, the threshold changing unit 217, the defective portion detection unit 218, the optical disk controller 219, and the reflection level adjustment unit 220 functioned as the "information processing device according to Claim 1 for processing the specific information that has been read." However, the access device 200 of the present invention is not limited to what is depicted in FIG. 2. As long as the functions of the various unit listed above are achieved, the scope of the present invention can encompass a device of any structure.

For example, the signal polarity inversion unit 206 can keep the polarity of a signal corresponding to a recording mark negative, and keep the polarity of a signal corresponding to a space positive, when the recording medium 100 is an H-to-L type. Also, the signal polarity inversion unit 206 can invert the polarity of a signal corresponding to a recording mark from positive to negative, and invert the polarity of a signal corresponding to a space from negative to positive, when the recording medium 100 is an L-to-H type. Therefore, the signal processing unit 208 is able to process the inputted signals on the premise that the polarity of signals corresponding to recording marks is negative and the polarity of signals corresponding to spaces is positive, regardless of whether the recording medium 100 loaded in the access device 200 is an H-to-L type optical disk or an L-to-H type optical disk. As a result, the system controller requires no further development, and debugging efficiency is improved.

Furthermore, the reflection level adjustment unit 220 is not limited to lowering the reflection level of light detected by the optical head 202 by reducing the intensity of light emitted by the optical head 202. For example, if the characteristic information indicates that the recording medium 100 is an L-to-H type, the reflection level adjustment unit 220 can lower the reflection level of light detected by the optical head 202 by reducing the ability of the optical head 202 to detect reflected light. Therefore, the intensity of light reflected by an L-to-H type optical disk can be reduced. As a result, the dynamic range of an integrated circuit can be used more efficiently.

Also, the characteristic identification unit 204 can identify the characteristic of an optical disk even if no characteristic information has been recorded to the optical disk. For example, the optical head 202 directs light at the unrecorded regions of an optical disk to which no characteristic information has been recorded. The optical head 202 detects the reflection level of light reflected by the unrecorded regions, and sends a signal indicating the reflection level of light reflected by the unrecorded regions to the characteristic identification unit 204. The characteristic identification unit 204 can determine whether the optical disk is an H-to-L type or an L-to-H type on the basis of whether or not the light reflection level indicated by this signal is greater than a predetermined value.

This determination of the characteristic may also be performed for a recording medium 100 to which characteristic information has been recorded. Here, if the reflection characteristic identified by the characteristic identification unit 204 from the light reflection level is not in agreement with the reflection characteristic identified by the characteristic identification unit 204 from the characteristic information, then the characteristic identification unit 204 identifies the characteristic by detecting the reflection level of the optical disk once more. Then, the characteristic identification unit 204 may perform subsequent processing while giving priority to the characteristic information, or the characteristic identification unit 204 may actuate the optical disk controller 219 to prohibit writing to the optical disk, among other such measures that can be taken.

3. Access Method

Figure 6:
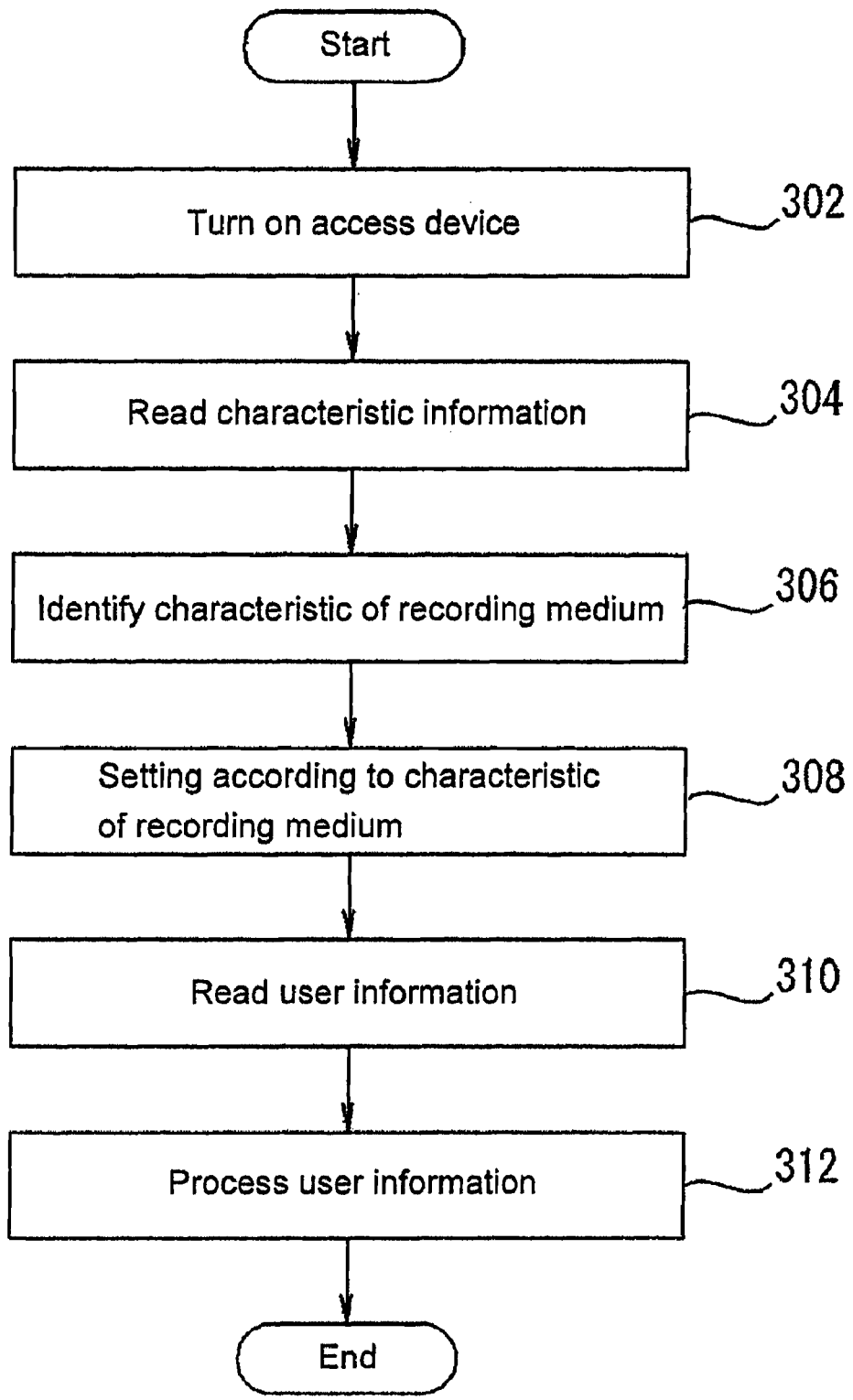
FIG. 6 shows the access processing procedure in an embodiment of the present invention.
Figure 7A:
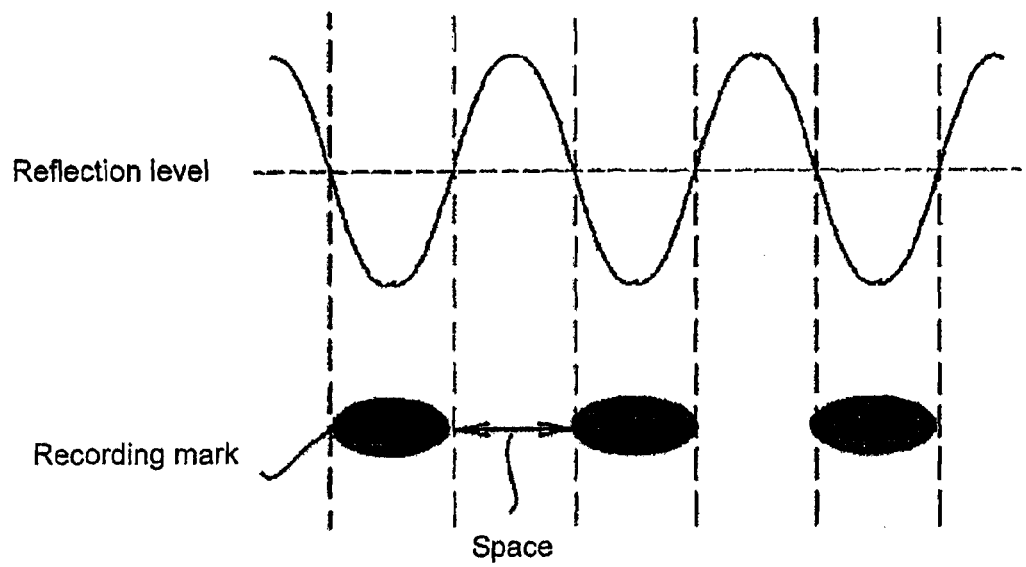
FIG. 7A shows the relation between a plurality of recording marks formed on an optical disk having a second characteristic (H-to-L characteristic) and the reflection level of light reflected by this optical disk.
Figure 7B:
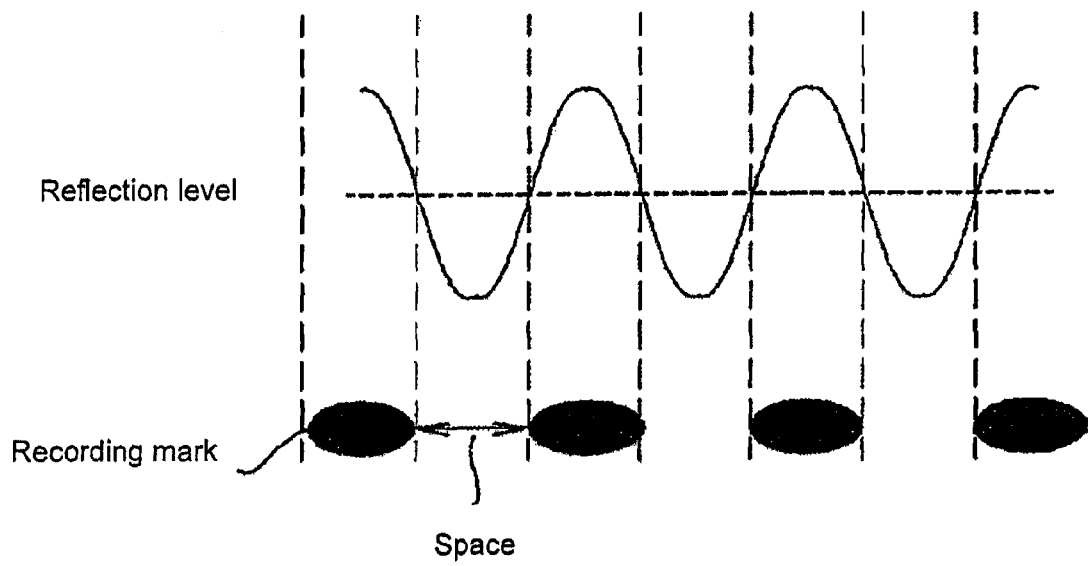
FIG. 7B shows the relation between a plurality of recording marks formed on an optical disk having a first characteristic (L-to-H characteristic) and the reflection level of light reflected by this optical disk.

FIG. 6 shows the access processing procedure in an embodiment of the present invention;

Each step of the access processing procedure in an embodiment of the present invention will now be described through reference to FIGS. 1, 2, and 6. The access processing procedure is executed by the access device 200. The recording medium 100 is inserted into the access device 200.

Step 302: The access device 200 is turned on.

Step 304: When the access device 200 is turned on, the optical head 202 accesses the PIC region 104 of the recording medium 100, and the optical head 202 reads characteristic information from the PIC region 104.

Step 306: The characteristic identification unit 204 determines whether the recording medium 100 is an H-to-L type optical disk or an L-to-H type optical disk on the basis on the characteristic information that has been read.

Step 308: If the recording medium 100 is determined to be an H-to-L type optical disk, the characteristic identification unit 204 subjects the signal polarity inversion unit 206, the threshold changing unit 217, the modulation computation unit 216, and the reflection level adjustment unit 220 to settings for processing information read from the H-to-L type optical disk.

If the recording medium 100 is determined to be an L-to-H type optical disk, the characteristic identification unit 204 subjects the signal polarity inversion unit 206, the threshold changing unit 217, the modulation computation unit 216, and the reflection level adjustment unit 220 to settings for processing information read from the L-to-H type optical disk.

Once the settings for processing information read from an optical disk have been completed, the processing moves to step 310.

Step 310: The optical head 202 accesses the data region 102 of the recording medium 100 and reads user information from the data region 102.

Step 312: The access device 200 processes the user information that has been read.

The access processing procedure in an embodiment of the present invention was described above through reference to FIGS. 1, 2, and 5.

The access processing procedure of the present invention is not limited to the procedure shown in FIG. 6. As long as the various above-mentioned steps are executed, the scope of the present invention can encompass a method comprising any steps.

An embodiment of the present invention was described above through reference to FIGS. 1 to 6.

For example, the various units described in the embodiment illustrated in FIG. 2 may be realized by hardware or by software, or by both hardware and software. Whether they are realized by hardware, by software, or by both hardware and software, as long as the access processing procedure of the present invention can be executed, any procedure may be employed.

For example, an access processing program for executing access processing is stored in the access device of the present invention.

The access processing program may be stored ahead of time, during the shipment of a computer, in a storage unit included in the access device. Alternatively, the access processing program may be stored in a storage unit after the shipment of a computer. For example, a user may download, either for a fee or free of charge, an access processing program from a specific Internet website, and install this downloaded program on a computer. If the access processing program has been recorded on a computer-readable recording medium, such as a flexible disk, CD-ROM, or DVD-ROM, an input device (such as a disk drive device) may be used to install the access processing program on a computer. The installed access processing program is stored in a storage unit.

Furthermore, the information processing device 225 (see FIG. 2; includes the characteristic identification unit 204, the signal polarity inversion unit 206, the signal processing unit 208, the modulation computation unit 216, the threshold changing unit 217, the defective portion detection unit 218, the optical disk controller 219, and the reflection level adjustment unit 220) can be manufactured as a single-chip semiconductor integrated circuit or a part thereof. When the information processing device 225 is manufactured as a single-chip semiconductor integrated circuit, it facilitates the process of manufacturing an access device. The various components constituting the information processing device 225 may be individually manufactured as integrated circuits, or one component of the information processing device 225 may be individually manufactured as an integrated circuit.

Also, with the access device 200, an example of reading the characteristic information from a recording medium 100 to which characteristic information had been recorded was described, but the route by which the characteristic information is acquired is not limited to this. For instance, a number of sets of characteristic information may be stored ahead of time in the access device 200, each in a storage component (not shown), and the characteristic information corresponding to the optical disk loaded in the access device 200 may be read from its storage component for use. Also, the access device 200 may acquire characteristic information externally, such as from a specific website on the Internet.

Examples of the present invention were described above by using preferred embodiments thereof, but the present invention should not be interpreted as being limited to these embodiments. It will be understood that the scope of the present invention should be interpreted by means of the claims alone. It will be understood that a person skilled in the art could use the descriptions in the specific preferred embodiments of the present invention to work an equivalent scope on the basis of the technical knowledge and the descriptions on the present invention. It will be understood that just as the contents of the patents, patent applications, and publications cited in this specification are themselves described in specific terms in this specification, these contents should be quoted as references to this specification.

The invention claimed is:

1. A recording medium from which information is optically reproduced, comprising:
    a characteristic information storing region for recording characteristic information indicating a characteristic of the recording medium, said characteristic information storing region being located in a permanent information and control data (PIC) region, and the characteristic information being pre-recorded for determining a L-to-H characteristic or a H-to-L characteristic of the recording medium,
    wherein the L-to-H characteristic defines that a first reflectance of light reflected by a recorded region of the recording medium is greater than a second reflectance of light reflected by an unrecorded region of the recording medium, and the H-to-L characteristic defines that the first reflectance of light reflected by the recorded region of the recording medium is less than the second reflectance of light reflected by the unrecorded region of the recording medium.

2. A method for reproducing the recording medium according to claim 1, the method comprising:
    irradiating the recording layer with laser light; and
    reproducing the characteristic information from the characteristic information region.

* * * * *